(12) United States Patent
Li et al.

(10) Patent No.: US 12,353,578 B2
(45) Date of Patent: Jul. 8, 2025

(54) METHOD OF CONSTRUCTING HIGH-PERFORMANCE ANTI-TAMPERING DATABASE BASED ON BLOCKCHAIN

(71) Applicant: Xidian University, Xi'an (CN)

(72) Inventors: Xinghua Li, Xi An (CN); Yunwei Wang, Xi An (CN); Xiaoqiang Li, Xi An (CN); Yanbing Ren, Xi An (CN); Hang Wang, Xi An (CN); Zhongyuan Hu, Xi An (CN)

(73) Assignee: Xidian University, Xi'an (CN)

( * ) Notice: Subject to any disclaimer, the term of this patent is extended or adjusted under 35 U.S.C. 154(b) by 300 days.

(21) Appl. No.: 17/505,994

(22) Filed: Oct. 20, 2021

(65) Prior Publication Data

US 2022/0043928 A1 Feb. 10, 2022

Related U.S. Application Data

(63) Continuation-in-part of application No. PCT/CN2020/107591, filed on Aug. 7, 2020.

(30) Foreign Application Priority Data

Aug. 5, 2020 (CN) .......................... 202010779632.8

(51) Int. Cl.
*G06F 21/62* (2013.01)
*G06F 16/182* (2019.01)
(Continued)

(52) U.S. Cl.
CPC ...... *G06F 21/6218* (2013.01); *G06F 16/1837* (2019.01); *G06F 16/2255* (2019.01);
(Continued)

(58) Field of Classification Search
CPC ...... G06F 21/60; G06F 21/62; G06F 21/6218; G06F 21/6245; G06F 21/64;
(Continued)

(56) References Cited

U.S. PATENT DOCUMENTS

| 2017/0236123 A1* | 8/2017 | Ali | G06Q 20/3825 |
|---|---|---|---|
| | | | 705/75 |
| 2019/0130114 A1* | 5/2019 | Smith | G06F 21/10 |

(Continued)

FOREIGN PATENT DOCUMENTS

| CN | 107657059 A | 2/2018 |
|---|---|---|
| CN | 108881163 A | 11/2018 |
| CN | 110365695 A | 10/2019 |

*Primary Examiner* — D'Arcy Winston Straub
(74) *Attorney, Agent, or Firm* — WPAT, PC

(57) ABSTRACT

A method of constructing a high-performance anti-tampering database based on blockchain includes: acquiring change increment information corresponding to data to-be-stored through at least one of database nodes and storing the change increment information as bottom-layer data of all the database nodes based on a blockchain data structure; determining resultant data information based on the change increment information, indexing and then storing the resultant data information as top-layer data of all the database nodes; performing mutual-checks on stored top-layer data as per a predetermined mutual-checking period and performing self-checks on stored bottom-layer data as per a predetermined self-checking period, by the database nodes; and restoring the bottom-layer and/or top-layer data of the database nodes according to results of mutual-checks and self-checks, to realize database construction. Based on the two-layered database architecture, high reliability and high availability of data can be ensured, and anti-tampering performance can be improved.

9 Claims, 4 Drawing Sheets

(51) Int. Cl.
 | | |
 |---|---|
 | *G06F 16/22* | (2019.01) |
 | *G06F 21/64* | (2013.01) |
 | *H04L 9/00* | (2022.01) |
 | *H04L 9/12* | (2006.01) |
 | *H04L 9/32* | (2006.01) |

(52) U.S. Cl.
CPC .............. *G06F 21/645* (2013.01); *H04L 9/12* (2013.01); *H04L 9/3239* (2013.01); *H04L 9/50* (2022.05)

(58) Field of Classification Search
CPC ...... G06F 21/645; G06F 16/18; G06F 16/182; G06F 16/1834; G06F 16/1837; G06F 16/22; G06F 16/2228; G06F 16/2255; H04L 9/12; H04L 9/50; H04L 9/32; H04L 9/3236; H04L 9/3239
See application file for complete search history.

(56) References Cited

U.S. PATENT DOCUMENTS

| | | | |
|---|---|---|---|
| 2020/0050691 A1* | 2/2020 | Surampalli | G06F 16/9024 |
| 2020/0076571 A1* | 3/2020 | Natarajan | H04L 9/50 |
| 2020/0104428 A1* | 4/2020 | Bier | H04L 9/3239 |

* cited by examiner

METHOD OF CONSTRUCTING HIGH-PERFORMANCE ANTI-TAMPERING DATABASE BASED ON BLOCKCHAIN

TECHNICAL FIELD

The disclosure relates to the technical field of network information technology, and in particular to a method of constructing a high-performance anti-tampering database based on block chain.

DESCRIPTION OF RELATED ART

With the development of network information technology, data security occupies an increasingly important position, especially in major national industries such as government affairs and commerce, military and national defense, aerospace, banking and securities, medical and health care. Ensuring data security is the top priority in network information technology.

In the related art, it is usually based on a database system to ensure data security. However, on the one hand, a core technology related to the existing database system is monopolized by foreign countries. On the other hand, the existing database system faces a risk of single point failure when storing data, and the stored data are easy to be tampered with illegally, and it is difficult to detect.

In order to solve the above-mentioned problems in the related art, blockchain-based distributed databases have emerged. However, the conventional blockchain-based distributed databases still have some problems that: (1) the conventional blockchain-based databases all adopt a sequential storage structure, which makes it difficult to establish a data index, resulting in low efficiency in data retrieval and being unable to meet user needs; and (2) the conventional blockchain-based databases do not support customized expansion at the data storage level, and require users to do a lot of additional adaptations to be suitable for existing business systems, resulting in high application costs and difficult deployments of the blockchain-based databases.

SUMMARY

In order to solve technical problems in the related art, the disclosure provides a method of constructing a high-performance anti-tampering database based on blockchain. The technical problem to be solved by the disclosure is realized by the following technical solutions.

Specifically, a method of constructing a high-performance anti-tampering database based on blockchain, being applied for a distributed peer-to-peer network including database nodes, and including: step 1, acquiring change increment information corresponding to data to-be-stored through the plurality of database nodes, and storing the change increment information as bottom-layer data of all of the plurality of database nodes based on a blockchain data structure; step 2, determining resultant data information based on the change increment information, indexing the resultant data information, and storing the resultant data information as top-layer data of all of the plurality of database nodes; step 3, performing mutual-checks on the stored top-layer data as per a predetermined mutual-checking period and performing self-checks on the stored bottom-layer data as per a predetermined self-checking period, by the plurality of database nodes; and step 4, restoring the bottom-layer data and/or top-layer data of the plurality of database nodes according to results of the mutual-checks and the self-checks, to thereby realize database construction.

In an embodiment of the disclosure, the step 1 includes: sub-step 1-1, broadcasting the change increment information acquired by a current database node of the plurality of database nodes in a transaction among all of the plurality of database nodes, as per an order of timestamps; and sub-step 1-2, packing a current transaction to-be-executed, by each of the plurality of database nodes, into a block when a consensus block-generation time arrives, and storing the block after passing a consensus of a predetermined number of database nodes in the entire network as the bottom-layer data.

In an embodiment of the disclosure, the step 2 includes: updating the resultant data information of the top-layer data according to a new block when the database node acquires the new block.

The disclosure may have following beneficial effects:
the disclosure adopts a two-layered database architecture, which can ensure high reliability and high availability of data. Specifically, in one aspect, the bottom-layer blockchain database can ensure data consistency and credibility through a consensus mechanism, and achieve high data reliability; in another aspect, the top-layer database uses self-check function and indexing, which can improve retrieval efficiency and achieve high data availability. Moreover, the bottom layer and the top layer can interact with each other to inspect/check and restore data according to a predetermined period, which further effectively guarantees the reliability of data and improves the anti-tampering performance.

The disclosure will be further described in detail below in combination with accompanying drawings and embodiments.

DETAILED DESCRIPTION OF EMBODIMENTS

The disclosure will be described in further detail below in combination with specific embodiments, but embodiments of the disclosure are not limited to these.

Figure 1:
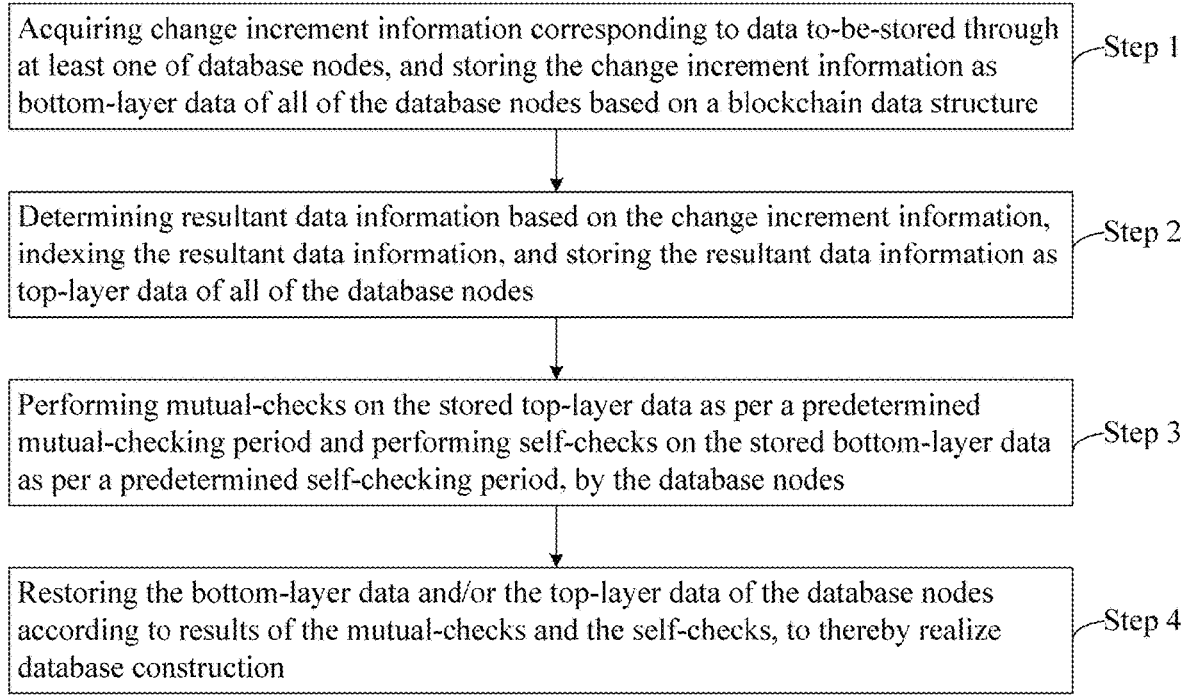
FIG. 1 is a schematic flowchart of a method of constructing a high-performance anti-tampering database based on blockchain according to an embodiment of the disclosure.

Referring to FIG. 1, FIG. 1 is a schematic flowchart of a method of constructing a high-performance anti-tampering database based on blockchain according to an embodiment of the disclosure. The method may be applied to a distributed peer-to-peer network, and the distributed peer-to-peer network includes multiple (i.e., more than one) database nodes. The method may include the following step 1 through step 4.

In the step 1, change increment information corresponding to data to-be-stored are obtained/acquired through (some or all of) the database nodes, and the change increment information are stored as bottom-layer data of all the database nodes based on a blockchain data structure.

Figure 2:
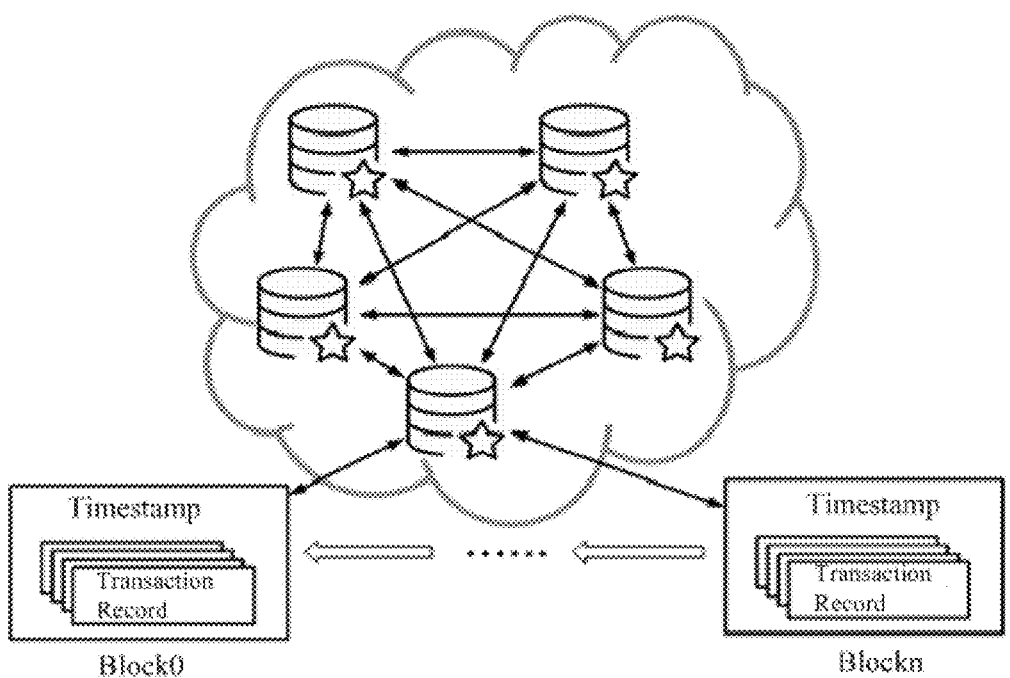
FIG. 2 is a schematic view of a two-layered database node structure in a distributed peer-to-peer network according to an embodiment of the disclosure.

Referring to FIG. 2, FIG. 2 is a schematic view of a two-layered database node structure in a distributed peer-to-peer network according to an embodiment of the disclosure. Multiple database nodes in the distributed peer-to-peer network together constitute a database system. The illustrated embodiment of the disclosure stores the bottom-layer data based on the blockchain data structure. The blockchain data structure is a chain data structure with high tail write performance Based on the high tail write performance, construction efficiency of the database system can be improved.

In an optional embodiment, the step 1 may include that:
sub-step 1-1, a current database node broadcasts its obtained change increment information in a transaction among all the database nodes as per an order of timestamps; and
sub-step 1-2, each of the database nodes packs a current transaction to-be-executed into a block when a consensus block-generation time arrives, and stores the block after passing a consensus of a predetermined number of database nodes in the entire network as its bottom-layer data.

In the illustrated embodiment of the disclosure, the current database node can receive a user's on-chain request through API (Application Programming Interface), and broadcast the on-chain request among all the database nodes in the transaction billing mode. The on-chain request may include the change increment information uploaded by a client.

In the step 2, resultant data information are determined based on the change increment information, the resultant data information are indexed, and the resultant data information are stored as top-layer data of all the database nodes.

In an optional embodiment, the step 2 may include that: when the database node obtains a new block, the resultant data information of the top-layer data is updated according to the new block.

The illustrated embodiment of the disclosure can divide the database node into a two-layered structure through a hierarchical design. The bottom layer stores the change increment information of the data to-be-stored, and the top layer stores the resultant data information of the data to-be-stored. For example, the data to-be-stored are horizontal plane height data, an initial horizontal plane height is 100 meters, and the database system obtains the change increment information of the horizontal plane height every hour, e.g., the horizontal plane rises 10 meters from 11:00 to 12:00, the horizontal plane rises 20 meters from 12:00 to 13:00, and the horizontal plane drops 5 meters from 13:00 to 14:00, so that the resultant horizontal plane height is 110 meters at 12:00, the resultant horizontal plane height is 130 meters at 13:00, and the resultant horizontal height is 125 meters at 14:00.

In an optional embodiment, the resultant data information are indexed may include: indexing the resultant data information based on a preset tree data structure.

The preset tree data structure may be set by those skilled in the art according to business needs, and the disclosure does not limit this. For example, the preset tree data structure is a B+ tree.

In summary, through the design of two-layered database architecture, the illustrated embodiment of the disclosure uses the blockchain database to store the change increment information at the bottom layer, uses a relational database at the top layer to store the resultant data information and builds an index at the top layer, thereby improving data retrieval efficiency. In addition, the highly flexible two-layered database architecture of the illustrated embodiment of the disclosure can solve the problem of single point failure in the conventional data system.

In the step 3, the database nodes perform mutual-checks on stored top-layer data as per a predetermined mutual-checking period, and perform self-checks on respective stored bottom-layer data as per a predetermined self-checking period.

Figure 3:
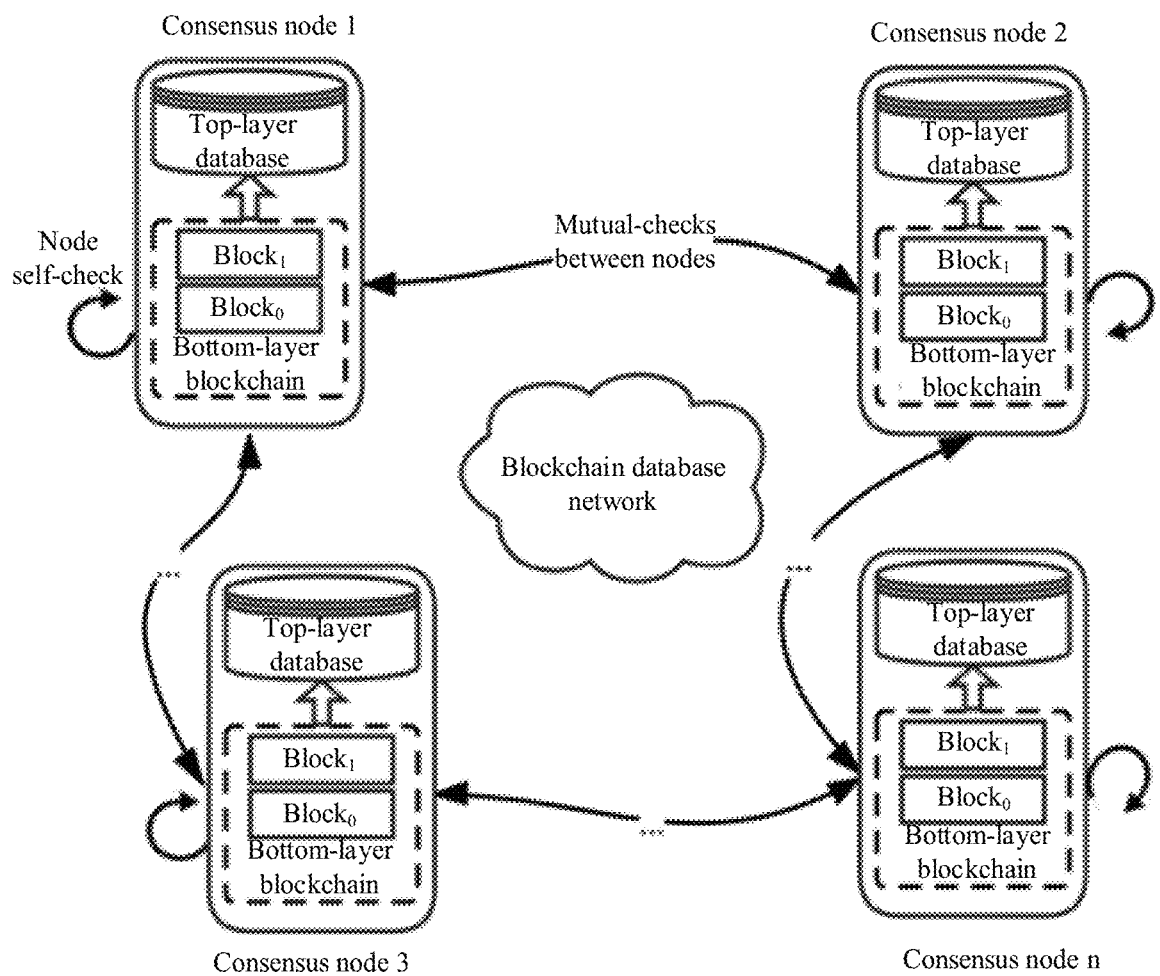
FIG. 3 is a schematic view of an architecture of self-check and node mutual-check of database nodes according to an embodiment of the disclosure.

Referring to FIG. 3, FIG. 3 is a schematic view of an architecture of mutual-checks and self-checks of database nodes according to an embodiment of the disclosure. The illustrated embodiment of the disclosure can detect/check whether the bottom-layer data and the top-layer data have been tampered with through regular self-check and mutual-check, and restore the tampered data effectively and in time, thereby ensuring the tamper-proof modification of on-chain data, improving accuracy of the stored data, and further improving reliability of the constructed/built database system.

In an optional embodiment, in the step 3, the database nodes perform mutual-checks on stored top-layer data as per a predetermined mutual-checking period may include the following sub-step 3-11 through sub-step 3-14.

In the sub-step 3-11, each of the database nodes obtains a new block which passes a consensus of a predetermined number of database nodes in the entire network, when each round of consensus block-generation time arrives.

The predetermined number in the illustrated embodiment of the disclosure can be preset by those skilled in the art according to business needs. Generally, the predetermined number of database nodes are a majority of the database nodes, and the majority can be understood as more than half. For example, when there are 20 database nodes in the entire network, the predetermined number can be 65%-100%, i.e., 13 to 20 database nodes; or, the predetermined number is 95%-100%, i.e., 19 to 20 database nodes.

In the sub-step 3-12, a Hash state value of a top-layer database recorded in the new block is obtained.

In the sub-step 3-13, the Hash state value corresponding to the new block is compared with a Hash state value of a top-layer database stored locally on the database node.

In the sub-step 3-14, when the two Hash state values are identical, it is determined that the top-layer data of the current database node has not been tampered with; or, when the two Hash state values are not identical, it is determined that the top-layer data of the current database node has been tampered with.

In an optional embodiment, in the step 3, the database nodes performs self-checks on respective stored bottom-layer data as per a predetermined self-checking period may include sub-step 3-21 through sub-step 3-23.

In the sub-step 3-21, between every two mutual-checks, a Hash chain relationship among blocks in a blockchain corresponding to the bottom-layer data is obtained.

In the sub-step 3-22, whether the Hash chain relationship is established is checked.

In the sub-step 3-23, when the Hash chain relationship is established, it is determined that the bottom-layer data of the current database node has not been tampered with; or, when the Hash chain relationship is not established, it is determined that the bottom-layer data of the current database has been tampered with.

In an optional embodiment, before the step 3, the method may further include step S11 through step S15.

In the step S11, a Hash state value corresponding to the top-layer data of a current database node is obtained/acquired, through the database node being block-generated in current round.

In the step S12, the Hash state value corresponding to the current database node which passes a consensus of a predetermined number of database nodes is broadcast to the other database nodes.

In the step S13, a Hash state value of a top-layer database which passes a consensus of the entire network and a Hash state value of a local top-layer database are obtained, by each the database node.

In the step S14, the Hash state value of the top-layer database which passes the consensus of the entire network is compared with the Hash state value of the local top-layer database.

In the step S15, when the Hash state value of the top-layer database which passes the consensus of the entire network and the Hash state value of the local top-layer database are not identical, the step 3 is carried out to start the self-check and mutual-check functions.

For example, the database system includes five database nodes A, B, C, D and E, a predetermined threshold is 2, the Hash state value of top-layer database corresponding to the current database node C is 3, the Hash state values corresponding to the database nodes A, B, D, E respectively are 2, 3, 2 and 2, it can be concluded after comparison that the Hash state value of the database node C is different from that of the database nodes A, D and E, and the Hash state value of the database node C is identical to that of the database node B. That is, the number of database nodes with different Hash status values with respect to the Hash state value of the current database node C is 3, namely the database nodes A, D and E, and thus the number of 3 nodes exceeds the predetermined threshold of 2, so that the self-check and mutual-check functions of database node C will be turned on.

It should be noted that the predetermined threshold can be set by those skilled in the art according to business needs, and the disclosure is not specifically limited. For another example, the predetermined threshold is ½ of the number of database nodes in the entire network.

When the number of database nodes with Hash state values different from the Hash state value corresponding to the current database node do not exceed the predetermined threshold, the current database node can continue to implement operations such as adding, deleting and modifying top-layer data and bottom-layer data through SQL (Structured Query Language) statements.

In the step 4, the bottom-layer data and/or top-layer data of the database nodes are restored according to results of the mutual-checks and the self-checks, to thereby realize database construction.

In an optional embodiment, based on the sub-step 3-11 through the sub-step 3-14, the step 4 may include sub-step 4-11 through sub-step 4-13.

In the sub-step 4-11, when a current database node determines that the top-layer data have been tampered with, it synchronizes the top-layer data from the other database nodes.

In the sub-step 4-12, first target top-layer data are determined from multiple top-layer data obtained by synchronization, via voting.

In the sub-step 4-13, the first target top-layer data are used to restore the top-layer data have been tampered with, to thereby achieve data restoration.

In an optional embodiment, based on the sub-step 3-21 through the sub-step 3-23, the step 4 may include sub-step 4-21 through sub-step 4-25.

In the sub-step 4-21, when the current database node determines that the bottom-layer data have been tampered with, it synchronizes the bottom-layer data from the other database nodes.

In the sub-step 4-22, target bottom-layer data are determined from multiple bottom-layer data obtained by synchronization, via voting.

In the sub-step 4-23, the target bottom-layer data are used to restore the bottom-layer data have been tampered with.

In the sub-step 4-24, second target top-layer data are determined based on the restored bottom-layer data.

In the sub-step 4-25, the second target top-layer data are used to restore the top-layer data of the current database node, to thereby achieve data restoration.

In an optional embodiment, before the sub-step 4-11, the method may further include the following step S21 through step S23.

In the step S21, the current database node sends a synchronization request message to the other database nodes, the synchronization request message includes a public key certificate of the current database node, a maximum block number and a random number.

It should be noted that, when the current database node determines that the top-layer data have been tampered with, it will discard the top-layer data have been tampered with.

For example, the current database node is a node X, the node X broadcasts the synchronization request message Request={Cert_X, t, Nonce, Sign $(Sk_x, H(Cert\_X\|t\|Nonce))$} corresponding to the tampered top-layer data. Where, Cert_X represents the public key certificate of the node X, t represents the maximum block number of current local blockchain, and Nonce represents the selected random number.

In the step S22, the other database nodes receive the synchronization request message, and verify authenticity and integrity of the synchronization request message.

In particular, as to the other nodes, after receiving request message, firstly verify its signature information to ensure authenticity of source and integrity of content of the request message.

In the step S23, the other database nodes, after passing the verification, send synchronization response messages to the current database node; each of the synchronization response messages includes a public key certificate and corresponding bottom-layer block data.

For example, a neighbor node K, after passing the verification, sends the node X with a synchronization response message Response_K={Cert_K, Block_lost, Nonce+1, Sign $(Sk_x, H(Cert\_K\|Block\_lost\|Nonce+1))$}. Where, Cert_K represents the public key certificate of the node K, and Block_lost represents a set/collection of discard blocks Block_lost={Block$_{t+1}$, . . . , Block$_n$} (assuming that the current newest block in the entire network is Block$_n$). The node X will receive responses from multiple neighbor nodes, restore all lost block data by selecting the legitimate response message containing the set of maximum lost blocks. The legality includes correctness of a chain relationship of blocks and validity of signature message.

In an optional embodiment, before the sub-step 4-21, the method may further include the following step S31 through step S33.

In the step S31, the current database node sends a synchronization request message to the other database nodes, and the synchronization request message includes a public key certificate of the current database node, a maximum block number and a random number.

In the step S32, the other database nodes receive the synchronization request message and verify authenticity and integrity of the synchronization request message.

In the step S33, the other database nodes, after passing the verification, send synchronization response messages to the current database node; and each of the synchronization response messages includes a public key certificate and corresponding bottom-layer block data.

In an optional embodiment, a sliding window is deployed in the database node, and the sliding window includes a preset reserved block number corresponding to the database node.

The disclosure may further support modular configurable functions. Specifically, in the database system constructed based on the disclosure: (1) for the bottom-layer blockchain database, modular consensus mechanism replacement schemes are supported, and users can flexibly realize the replacement of consensus protocol based on their own business needs; for example, the current database system is equipped with a Raft consensus protocol with both security and consensus efficiency, and users can customize and flexibly replace with a PBFT consensus protocol with higher security, or manually specify the block-generation time; (2) the top-layer database supports data access through various interfaces and is compatible with various common database accesses, for example relational databases postgres, mysql, etc., supports users to choose based on business needs, and supports users to submit query requests including complex operations such as filtering, clustering, joining and sorting using standard SQL statements.

The preset reserved block number is also referred to as preset data retention time parameter.

A step of storing data through the sliding window may include the flowing step S41 through step S43.

In the step S41, the database node obtains the latest block in the blockchain.

In the step S42, the magnitude relationship between the number of the latest block and the preset reserved block number is obtained.

In the step S43, when the latest block number is greater than the preset reserved block number, all blocks in the window and a genesis block are reserved.

In an optional embodiment, after the step S43, the method may further include: deleting a block body in a block outside the window, and reserving a block header in the block outside the window.

A sliding window module deployed in the disclosure can provide a configurable automatic cleaning function. The preset reserved block number can be flexibly set by those skilled in the art according to business needs, and the disclosure does not limit to this. By setting the preset reserved block number, users can flexibly configure the duration of transaction data stored in the database system, such as storing transaction data for 2 months.

The traditional database adopts a centralized architecture, the addition, deletion and modification of data are completed by a single node, which cannot prevent and detect malicious deletion and modification of data after a single node is compromised by an attacker, nor can it prevent nodes from writing false data to the database. In addition, data in the traditional database is often stored in a single node, making the data face a problem of serious single point failure.

The database constructed based on the disclosure can combine the blockchain (bottom-layer database) with the local database (top-layer database), which can effectively solve the security bottleneck of the traditional database. Since data are distributed and stored in multiple nodes in the network, the disclosure can effectively detect and prevent malicious nodes from maliciously adding, tampering and deleting data. In addition, the disclosure can effectively solve the problem of single point failure in the traditional database by using blockchain technology.

The comparison between the database constructed by an embodiment of the disclosure and the traditional database is shown in Table 1.

TABLE 1

Comparison between database of the disclosure and traditional database

| Different databases | Comparison items | | | | |
|---|---|---|---|---|---|
| | System architecture | Malicious data addition prevention | Data tampering prevention | Data deletion prevention | Resistant to single point failure |
| Traditional database | centralized | x | x | x | x |
| Database of the disclosure | distributed | √ | √ | √ | √ |

It can be seen from Table 1 that: the disclosure may have significant advantages in anti-tampering, deletion prevention, resistant to single point failure, and so on.

At present, there are relatively few database researches and products based on blockchain, and the most representative results are a decentralized open source blockchain platform Ethereum, and a blockchain-based database application platform ChainSQL. In the Ethereum, it is difficult to implement functions such as adjustment, and data query efficiency is low. In the ChainSQL, every instruction for database operation is recorded in a transaction, that is, one transaction corresponds to one database operation, the blockchain network will record all operations on the database in the form of transactions. For a blockchain node configured with a database, the operation of the database will be completed while the blockchain network records the transaction, whereas for a network node that is not configured with a database, the transaction will only be recorded in the block of the current node. Therefore, the ChainSQL has the following disadvantages: (1) storage burdens of nodes are too heavy; and (2) regular self-check and mutual-check of data on the chain are not involved. The comparison between the database constructed by the disclosure and other blockchain databases is shown in Table 2.

TABLE 2

Comparison between database of the disclosure and other blockchain databases

| Comparison items Different databases | Anti-tampering | Resistant to single point failure | Combining with local database | Data restoration | Light-weight storage | Regular self-check and mutual-check |
|---|---|---|---|---|---|---|
| Ethereum | √ | √ | x | √ | x | x |
| ChainSQL | √ | √ | √ | √ | x | x |
| Database of the disclosure | √ | √ | √ | √ | √ | √ |

It can be seen from Table 2 that: the database of the disclosure may have significant advantages in periodic check of tamper proof, lightweight storage, etc.

Figure 6:
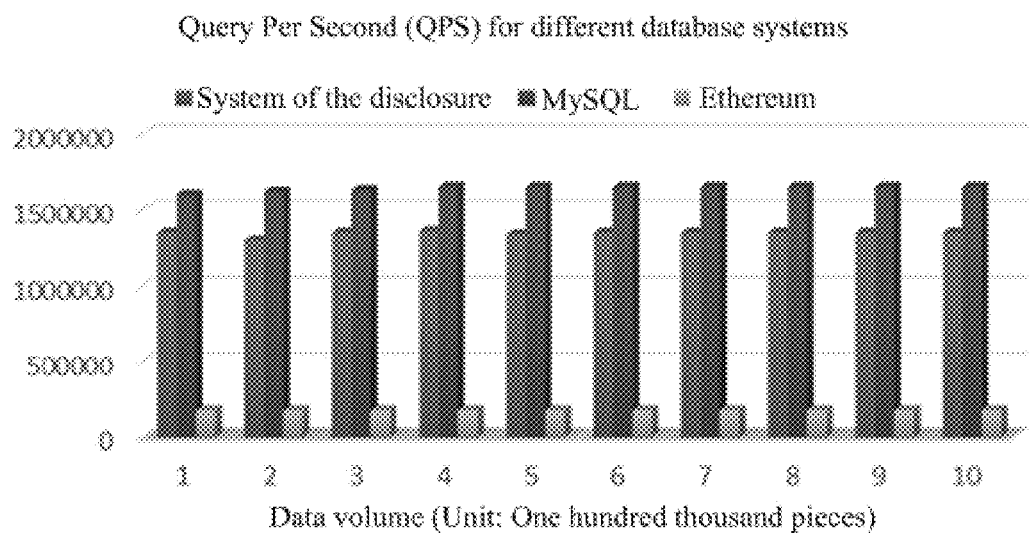
FIG. 6 is a schematic diagram showing queries per second based on different database systems according to an embodiment of the disclosure.
Figure 7:
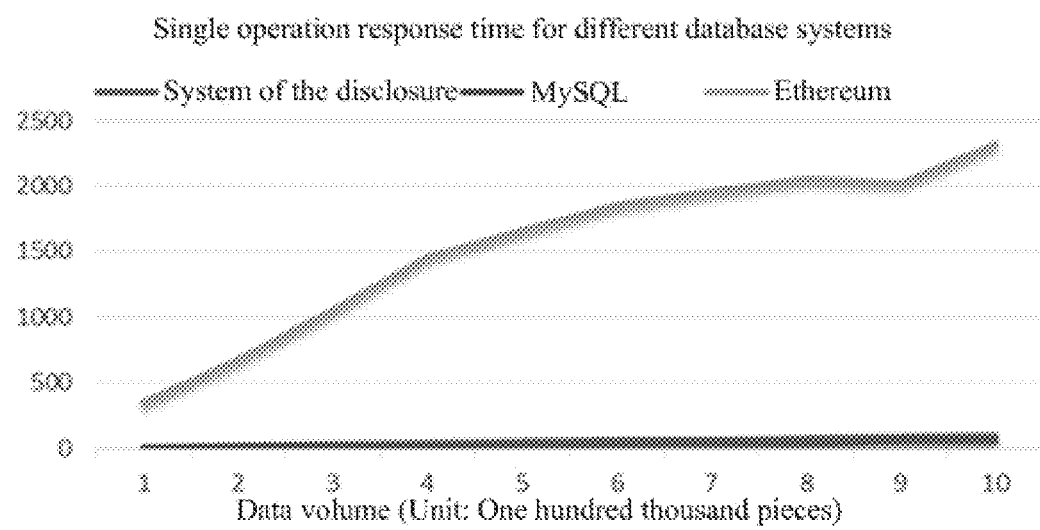
FIG. 7 is a schematic diagram showing single operation response times based on different database systems according to an embodiment of the disclosure.

Besides the above-mentioned functional comparisons, the disclosure is further based on experiments to compare the throughput and response time of a single operation between the database constructed based on the disclosure and the conventional blockchain databases, as shown in FIGS. 6 and 7.

The experimental results of FIGS. 6 and 7 show that: compared with the conventional blockchain databases, concurrent query performance of the high-performance anti-tampering database system based on blockchain proposed by the disclosure can be improved by about 70%, and the response time for operations such as adding, deleting, modifying and checking in a database with millions of records does not exceed 100 ms.

Figure 4:
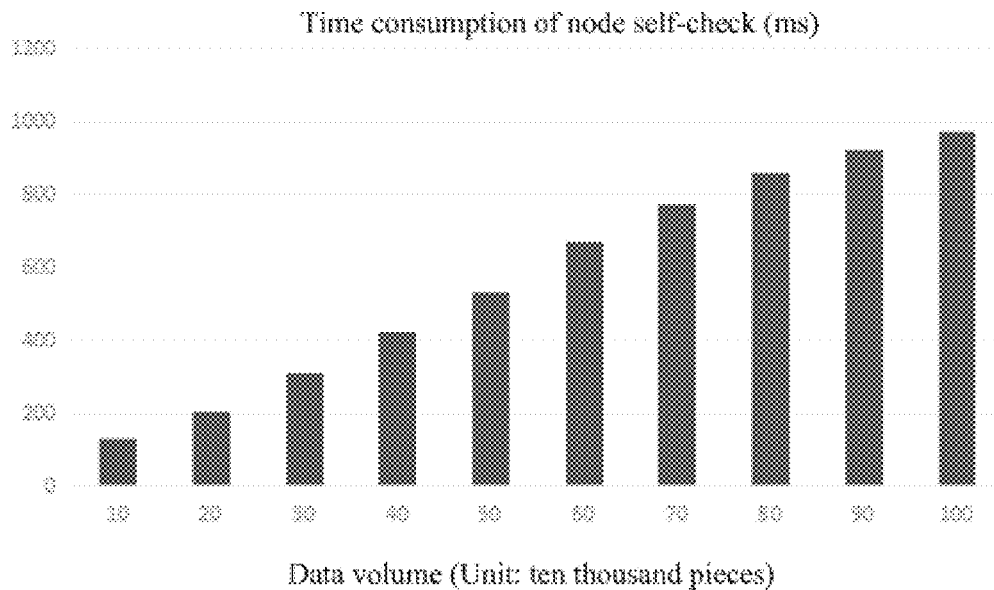
FIG. 4 is a schematic diagram showing a relationship between data volume and time consumption of node self-check according to an embodiment of the disclosure.

In terms of the performance of the impact of data volume on the node self-check, the disclosure deploys a virtual machine for testing (8 cores 8G), and the test result is shown in FIG. 4. As the data volume increases, the time spent/consumed on node self-check also increases.

Figure 5:
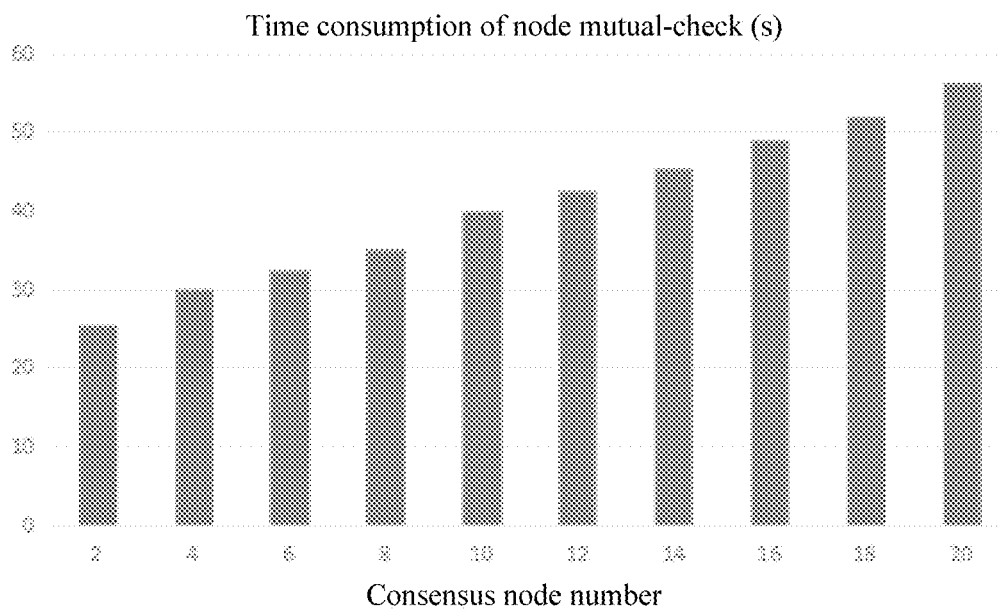
FIG. 5 is a schematic diagram showing a relationship between consensus node number and time consumption of node mutual-check according to an embodiment of the disclosure.

Regarding the influence of consensus node number on the node mutual-check performance, the disclosure deploys a virtual machine for testing (8 cores 8G), and the test result is shown in FIG. 5. As the consensus node number increases, the time spent/consumed on node mutual-check also gradually increases.

In summary, the disclosure can improve performance such as retrieval efficiency based on the relational storage structure, and can also check and restore data as per a preset period, thereby effectively ensuring data reliability and improving anti-tampering performance. In addition, the disclosure can also provide a configurable automatic cleaning function, and support modular consensus mechanism replacement schemes, thereby improving scalability and compatibility of the database system.

The above is a further detailed description of the disclosure combined with specific preferred embodiments, and it cannot be considered that the specific implementations of the disclosure are limited to these descriptions. For ordinary technicians in the technical field to which the disclosure belongs, several simple deductions or substitutions can be made without departing from the concept of the disclosure, which should be regarded as belonging to the protection scope of the disclosure.

What is claimed is:

1. A method of constructing an anti-tampering database based on blockchain, applied for a distributed peer-to-peer network, wherein the distributed peer-to-peer network comprises a plurality of database nodes, each database node has a two-layered structure composed of a top-layer database and a bottom-layer database, and the method comprises:
   acquiring change increment information corresponding to data to-be-stored through the plurality of database nodes, and storing, based on a blockchain data structure, the change increment information as bottom-layer data of all of the plurality of database nodes in bottom-layer databases;
   determining resultant data information corresponding to the data to-be-stored based on the change increment information, indexing the resultant data information at top-layer databases of all of the plurality of database nodes, and storing the resultant data information as top-layer data of all of the plurality of database nodes in the top-layer databases;
   performing mutual-checks on the stored top-layer data in the top-layer databases as per a predetermined mutual-checking period and performing self-checks on the stored bottom-layer data in the bottom-layer databases as per a predetermined self-checking period, by the plurality of database nodes; and
   restoring the bottom-layer data and/or the top-layer data of the plurality of database nodes according to results of the mutual-checks and the self-checks, to thereby realize database construction;
   wherein the top-layer databases are relational databases, and the bottom-layer databases are blockchain databases;
   wherein the performing mutual-checks on the stored top-layer data in the top-layer databases as per a predetermined mutual-checking period by the plurality of database nodes comprises:
      acquiring, by each database node, a new block which passes a consensus of a predetermined number of the database nodes in the entire network when each round of consensus block-generation time arrives;
      acquiring a hash state value of a top-layer database recorded in the new block;
      comparing the hash state value corresponding to the new block with a hash state value of the top-layer database stored locally in the database node; and
      determining the top-layer data of the database node have not been tampered with when the two hash state values are identical, or determining the top-layer data of the database node have been tampered with when the two hash state values are not identical;
   wherein the performing self-checks on the stored bottom-layer data in the bottom-layer databases as per a predetermined self-checking period by the plurality of database nodes comprises:
      acquiring a hash chain relationship among blocks in a blockchain corresponding to the bottom-layer data, between every two mutual-checks;
      checking whether the hash chain relationship is established; and
      determining the bottom-layer data of a current database node of the plurality of database nodes have not been tampered with when the hash chain relationship is established, or determining the bottom-layer data of the current database node have been tampered with when the hash chain relationship is not established;
   wherein each of the plurality of database nodes is deployed with a sliding window, and the sliding window comprises a preset reserved block number corresponding to the database node; and
   wherein the method further comprises: performing data storing through the sliding window, comprising:

obtaining, by the database node, a latest block in the blockchain;

obtaining a magnitude relationship between a number of the latest block and the preset reserved block number; and in response to the number of the latest block being greater than the preset reserved block number, reserving all blocks in the sliding window and a genesis block, deleting a block body in a block outside the sliding window, and reserving a block header in the block outside the sliding window.

2. The method as claimed in claim 1, wherein the acquiring change increment information corresponding to data to-be-stored through the plurality of database nodes, and storing, based on a blockchain data structure, the change increment information as bottom-layer data of all of the plurality of database nodes in bottom-layer databases comprises:

broadcasting the change increment information acquired by a current database node of the plurality of database nodes in a transaction among all of the plurality of database nodes, as per an order of timestamps; and packing a current transaction to-be-executed, by each of the plurality of database nodes, into a block when a consensus block-generation time arrives, and storing the block after passing a consensus of a predetermined number of database nodes in the entire network as the bottom-layer data.

3. The method as claimed in claim 2, wherein the determining resultant data information corresponding to the data to-be-stored based on the change increment information, indexing the resultant data information at top-layer databases of all of the plurality of database nodes, and storing the resultant data information as top-layer data of all of the plurality of database nodes in the top-layer databases comprises:

updating the resultant data information of the top-layer data according to a new block when the database node acquires the new block.

4. The method as claimed in claim 1, wherein indexing the resultant data information comprises:

indexing the resultant data information based on a preset tree data structure.

5. The method as claimed in claim 1, wherein the restoring the top-layer data of the plurality of database nodes according to results of the mutual-checks and the self-checks, to thereby realize database construction comprises:

synchronizing the top-layer data from the other database nodes of the plurality of database nodes, when a current database node of the plurality of database nodes determines the top-layer data have been tampered with;

determining first target top-layer data from a plurality of top-layer data obtained by the synchronizing, via voting; and using the first target top-layer data to restore the top-layer data have been tampered with, to realize data restoration.

6. The method as claimed in claim 5, wherein before the synchronizing the top-layer data from the other database nodes of the plurality of database nodes, when a current database node of the plurality of database nodes determines the top-layer data have been tampered with, the method further comprises:

sending, by the current database node, a synchronization request message to the other database nodes, wherein the synchronization request message comprises a public key certificate of the current database node, a maximum block number and a random number;

receiving, by the other database nodes, the synchronization request message, and verifying authenticity and integrity of the synchronization request message; and after passing the verification, sending, by the other database nodes, synchronization response messages to the current database node, wherein each of the synchronization response messages comprises a public key certificate and bottom-layer block data of a corresponding one of the other database nodes.

7. The method as claimed in claim 1, wherein the restoring the bottom-layer data and the top-layer data of the plurality of database nodes according to results of the mutual-checks and the self-checks, to thereby realize database construction comprises:

synchronizing the bottom-layer data from the other database nodes of the plurality of database nodes, when the current database node determines the bottom-layer data have been tampered with;

determining target bottom-layer data from a plurality of bottom-layer data obtained by the synchronizing, via voting;

using the target bottom-layer data to restore the bottom-layer data have been tampered with;

determining second target top-layer data based on restored bottom-layer data; and using the second target top-layer data to restore the top-layer data of the current database node, to realize data restoration.

8. The method as claimed in claim 7, wherein before synchronizing the bottom-layer data from the other database nodes of the plurality of database nodes, when the current database node determines the bottom-layer data have been tampered with, the method further comprises:

sending, by the current database node, a synchronization request message to the other database nodes, wherein the synchronization request message comprises a public key certificate of the current database node, a maximum block number and a random number;

receiving, by the other database nodes, the synchronization request message, and verifying authenticity and integrity of the synchronization request message; and after passing the verification, sending, by the other database nodes, synchronization response messages to the current database node, wherein each of the synchronization response messages comprises a public key certificate and bottom-layer block data of a corresponding one of the other database nodes.

9. The method as claimed in claim 1, before the performing mutual-checks on the stored top-layer data in the top-layer databases as per a predetermined mutual-checking period and performing self-checks on the stored bottom-layer data in the bottom-layer databases as per a predetermined self-checking period, by the plurality of database nodes, further comprising:

acquiring a hash state value corresponding to the top-layer data of a current database node of the plurality of database nodes, through the database node being block-generated in a current round;

broadcasting the hash state value corresponding to the current database node which passes a consensus of a predetermined number of database nodes, to the other database nodes of the plurality of database nodes;

acquiring a hash state value of a top-layer database which passes a consensus of the entire network and a hash state value of a local top-layer database, by each of the plurality of database nodes;

comparing the hash state value of the top-layer database which passes the consensus of the entire network with the hash state value of the local top-layer database; and carrying out the performing mutual-checks on the stored top-layer data in the top-layer databases as per a predetermined mutual-checking period and performing self-checks on the stored bottom-layer data in the bottom-layer databases as per a predetermined self-checking period, by the plurality of database nodes to start the self-check and the mutual-check, when the hash state value of the top-layer database which passes the consensus of the entire network and the hash state value of the local top-layer database are not identical.

* * * * *